United States Patent [19]
Le Sergent

[11] Patent Number: 5,364,429
[45] Date of Patent: Nov. 15, 1994

[54] METHOD OF MANUFACTURING ACTIVE OPTICAL FIBERS

[75] Inventor: Christian Le Sergent, Marcoussis, France

[73] Assignee: Alcatel Fibres Optiques, Bezons Cedex, France

[21] Appl. No.: 917,382

[22] Filed: Jul. 23, 1992

[30] Foreign Application Priority Data

Jul. 25, 1991 [FR] France ................ 91 09429

[51] Int. Cl.$^5$ ............................. C03B 37/023
[52] U.S. Cl. ........................ 65/399; 65/17.4; 65/415; 65/435
[58] Field of Search ............... 65/3.11, 3.12, 13, 18.2

[56] References Cited

U.S. PATENT DOCUMENTS

| | | | |
|---|---|---|---|
| 3,516,001 | 6/1970 | Koester et al. | |
| 4,203,743 | 5/1980 | Suganuma et al. | 65/3.12 |
| 4,636,235 | 1/1987 | Glessner et al. | 65/3.12 |
| 4,675,040 | 6/1987 | Tanaka et al. | 65/3.12 |
| 4,784,454 | 11/1988 | Dyott . | |
| 4,975,102 | 12/1990 | Edahiro et al. | 65/3.12 |

FOREIGN PATENT DOCUMENTS

| | | |
|---|---|---|
| 0044712 | 1/1982 | European Pat. Off. . |
| 0224282 | 6/1987 | European Pat. Off. . |
| 0313209 | 4/1989 | European Pat. Off. . |
| 0437935 | 7/1991 | European Pat. Off. . |
| 2022683 | 8/1970 | France . |
| 2100464 | 12/1982 | United Kingdom . |

OTHER PUBLICATIONS

World Patents Index Latest, Section Ch, Derwent Publications Ltd., London, Great Britain; CLass L, AN 90-127346 & JP-A-02 074 534 (NTT) Mar. 14, 1990 & Patent Abstracts of Japan, vol. 14, No. 261, (C-725) [4204], Jun. 6, 1990.

Patent Abstracts of Japan, vol. 15, No. 372 (P-1254) Sep. 19, 1991 & JP-A-03 145 608 (Mitsubishi Electric Corp.) Jun. 20, 1991.

World Patents Index Latest, Section Ch, Derwent Publication Ltd., London, Great Britain; Class A, AN 82-00793E & JP-A-56 155 035 (NTT et al.) Dec. 1, 1981.

Journal of Lightwave Technology, vol. 8, No. 11, Nov. 1990, New York, USA, pp. 1680-1683.

R. P. Tumminelli et al.: "Fabrication of High-Concentration Rare-Earth Doped Optical Fibers Using Chelates".

Patent Abstracts of Japan, vol. 15, No. 268 (P-1224) Fuly 8, 1991 & JP-A-03 089 305 (Japan Aviation Electron IND. Ltd. et al.) Apr. 15, 1991.

*Primary Examiner*—Robert L. Lindsay
*Attorney, Agent, or Firm*—Sughrue, Mion, Zinn, Macpeak & Seas

[57] ABSTRACT

A method of manufacturing active optical fibers comprising preparing a preform and then drawing a fiber from the preform, wherein the method consists in using a preform having a doped peripheral outer zone, said zone being intended to constitute the outer cladding of the optical fiber, the doping of the peripheral zone giving it a refractive index greater than that of the optical cladding, and giving it a difference in softening temperature relative to that of the core of the optical fiber which is less than the difference that would exist if the outer zone were not doped.

5 Claims, 1 Drawing Sheet

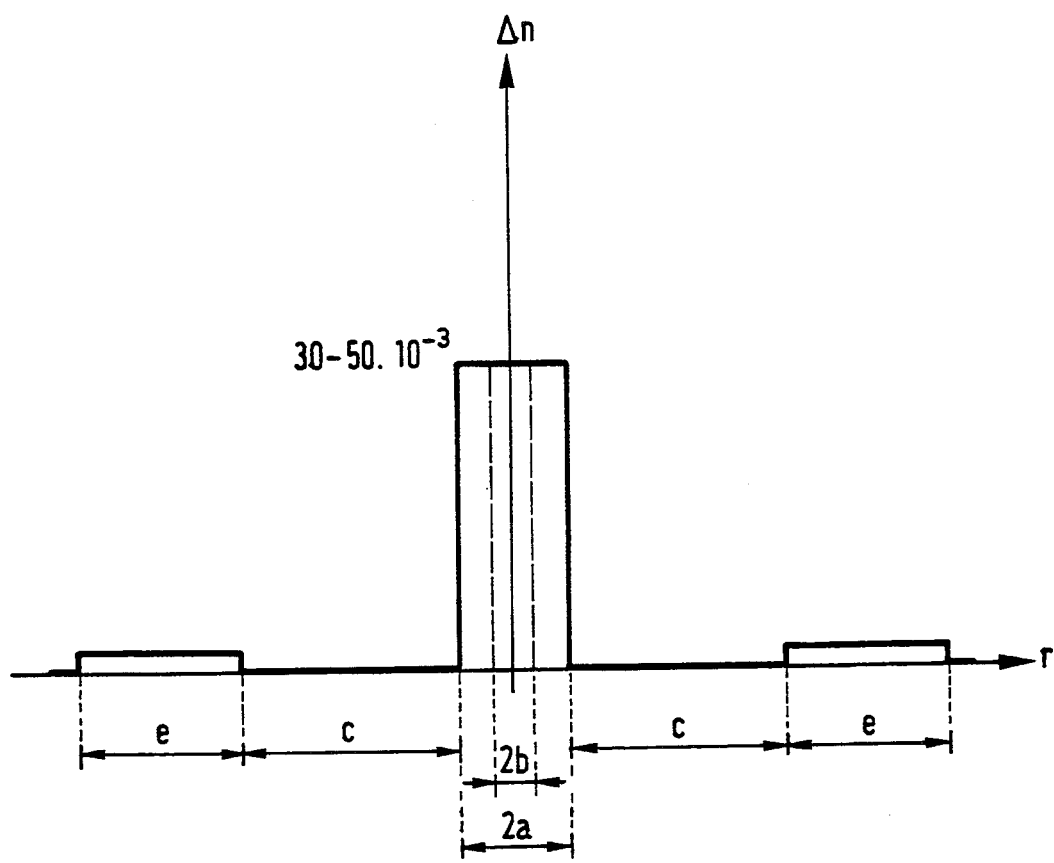

METHOD OF MANUFACTURING ACTIVE OPTICAL FIBERS

The present invention relates to a method of manufacturing active optical fibers (lasing or amplifying).

BACKGROUND OF THE INVENTION

There exist several methods of manufacturing optical fibers. However, the procedure always includes the following:

preparing a preform, i.e. a rod of vitreous silica of very high purity having the desired refractive index profile; and then drawing the fiber from the preform.

To manufacture optical fibers for telecommunications purposes, the common practice is to use vapor reaction methods which enable very high degrees of purity to be obtained. The base material is pure silica. Dopants, called "primary" dopants, are added to modify the refractive index of the silica. The dopants selected depend on the desired index difference. For example, boron and fluorine can be used to reduce the refractive index of silica, or phosphorous and germanium can be used to increase it.

Active optical fibers have also been known for some time which are obtained by doping using rare earth elements, e.g. erbium. These dopants are called "secondary" dopants. They are generally used together with another dopant which is a primary dopant, namely alumina, for the purpose of avoiding the phenomenon of rare earth ions "clustering".

To obtain better efficiency in active optical fibers, it has been found necessary to improve interaction between light and matter. This can be done in two ways. Firstly, by increasing energy density in the core of the optical fiber by reducing its radius, e.g. to the m range. This makes it necessary to have a large index difference (about 30 to $50 \times 10^{-3}$) and a high concentration of primary dopant. Alternatively, interaction between light and matter can be improved by confining the active species (e.g. erbium) in the most central region of the core.

A problem then arises of the primary and the secondary dopants diffusing which makes it difficult to obtain the two above-mentioned objectives.

Such diffusion takes place during all stages of the manufacturing method in which heating to a high temperature is required, namely during collapsing and possible stretching of the preform and also during fiber-drawing. The temperature is normally governed by the refractory nature of the non-doped outer cladding. This problem due to diffusion occurs as soon as the preform is made, e.g. using the well known technique of internal modified chemical vapor deposition (MCVD). For spectroscopically-favorable core compositions, including an $Al_2O_3$ content of about 10% and a $GeO_2$ content of a few tens of %, this diffusion problem manifests itself in the extreme difficulty of simultaneously obtaining:

$\Delta n > 30 \times 10^{-3}$ $2A > 1$ mm (where A is the radius of the core in the preform); and the radius in which the secondary dopant is confined is significantly different from A.

There also arises a problem of thermomechanical stresses due to the large difference in expansion coefficient between the core of the fiber having a high content of primary dopant and its outer cladding which is normally undoped.

In order to mitigate these drawbacks, the present invention proposes making preforms and fibers in which the outer cladding is doped, making it possible:

to maintain its refractive index at a level slightly greater than that of the optical cladding;

reducing its softening temperature to a value close to that of the optical cladding, thereby making it possible to provide preforms and fibers under temperature conditions that are lower, thereby reducing diffusion phenomena; and to reduce the mean thermomechanical stresses by moving the expansion coefficients or the softening temperatures closer together.

In internal deposition techniques, it is the deposition tube that must include the doping. The invention is applicable, in particular, to the techniques of internal deposition in a tube known by the terms MCVD, plasma chemical vapor deposition (PCVD), surface wave plasma chemical vapor deposition (SPCVD), etc. The techniques used for rare earth doping may be impregnation, nebulization, or the organometallic method.

SUMMARY OF THE INVENTION

The present invention thus provides a preform for drawing an active optical fiber, the preform comprising an inner zone intended to constitute the core of the optical fiber and an outer zone intended to constitute the optical cladding of the fiber, the preform including primary optical doping to confer large index difference between the core and the optical cladding of the fiber, secondary doping of the inner zone enabling an active species to be concentrated in the center of the core of the fiber, wherein the outer peripheral portion the outer zone is doped so as to impart thereto a difference softening temperature relative to the inner zone that is smaller than the difference which would exist if it were not doped.

The invention also provides a method of manufacturing active optical fibers comprising preparing a preform and then drawing a fiber from the preform, wherein the method consists in using a preform having a doped peripheral outer zone, said zone being intended to constitute the outer cladding of the optical fiber, the doping of the peripheral zone giving it a refractive index greater than that of the optical cladding, giving it a difference in softening temperature relative to that of the core of the optical fiber which is less than the difference that would exist if the outer zone were not doped.

The preform may be obtained by chemical vapor deposition performed inside a tube, the tube constituting said doped peripheral outer zone.

This doped peripheral outer zone may be constituted by silica doped with at least one of the following dopants at following concentrations by mass:

$0.2\% > P_2O_5 > 4\%$ $0 > F > 0.2\%$.

It may also be constituted by silica doped with at least one of the following dopants at the following concentrations by mass:

$0 < P_2O_5 > 2\%$
$0.1\% < Al_2O_3 < 2\%$
$0 < F < 1\%$.

BRIEF DESCRIPTION OF THE DRAWING

The invention will be better understood and other advantages and features will appear on reading the following description given by way of non-limiting example and accompanied by the sole figure of the accompanying drawing which is a diagram showing the structure of an active optical fiber of the invention.

DETAILED DESCRIPTION

The diagram of FIG. 1 shows the refractive index $\Delta n$ of a silica-based optical fiber plotted up the ordinate. The ordinate axis corresponds to the axis of the optical fiber and consequently to the axis of the preform. The abscissa shows the distance r from the axis of the fiber. The fiber core of diameter $2a$ (corresponding to a diameter 2A in the preform) is doped with the primary dopants $Al_2O_3$ and $GeO_2$, for example. The active species, e.g. erbium, is confined to the central portion of the core having a diameter $2b$. Around the core of the fiber, over an annulus of width c, there is optical cladding of diameter $2d$ in the fiber, corresponding to a diameter 2D in the preform. Around the optical cladding, over an annulus of width e, there is the outer cladding of the optical fiber. In contrast to conventional practice, this portion of silica cladding is lightly doped.

For example, to obtain a preform having an optical cladding whose index is $10^{-3}$ down relative to silica, the outer cladding has an index that is $0.5 \times 10^{-3}$ down relative to silica and has a softening temperature which is about 200° C. less than that of silica, thus making it possible to proceed as follows. An MCVD manufacturing technique is used whereby successive deposits are made inside a tube. The composition of the deposition tube is selected to have a phosphorous pentoxide content of the order of 1.1% by weight and a fluorine content of the order of 0.1% by weight as an index compensator. Such tubes can be made using conventional techniques of machining and drawing down balls of doped silica, e.g. made using a vapor axial deposition (VAD) technique.

The conventional operations of depositing the optical cladding, the outer layers of the core, and the inner layers doped with a rare earth are then performed, e.g. using an organometallic precursor as described in the article "Fabrication of high concentration rare earth doped optical fibers using chelates" by R. P. Tumminelli et al., published in the Journal of Lightwave Technology, Vol. 8, No. 11, November 1990. The operations of collapsing, drawing, and fitting ends are also performed while applying the absolute minimum amount of heating power.

It is thus possible to obtain fibers having an index $\Delta n$ greater than $35 \times 10^{-3}$, with the rare earth dopant confined in the central portion of the core, said fibers having amplification characteristics that are improved by about 20% for a pumping power of 5 mV at 1.478 $\mu$m and for a $-40$ dBm signal at 1532 nm. Such fibers have reduced thermomechanical stresses.

I claim:

1. A preform for drawing an active optical fiber, said preform comprising an inner zone for constituting a core of the optical fiber and an outer zone for constituting the optical cladding of the fiber, said preform including primary optical doping to confer a large index difference between the core and the optical cladding of the fiber, secondary doping of said inner zone enabling an active species to be concentrated in the center of the core of the fiber, and the outer peripheral portion of the outer zone being doped to impart thereto a difference in softening temperature relative to the inner zone that is smaller than a difference which exists if said outer zone were not doped.

2. In a method of manufacturing active optical fibers comprising: preparing a preform and then drawing a fiber from the preform, the improvement wherein said method consists in preparing said preform with a doped peripheral outer zone for constituting an outer cladding of the optical fiber, the doping of the peripheral zone providing the optical fiber with a refractive index greater than that of the optical cladding, and providing a difference in softening temperature relative to that of the core of the optical fiber which is less than a difference that exists if the outer zone were not doped.

3. A method according to claim 2, wherein the preform is obtained by chemical vapor deposition performed inside a tube, the tube constituting said doped peripheral outer zone.

4. A method according to claim 2, wherein the preform is based on silica, and the doped peripheral outer zone is constituted by silica doped with at least the following dopants at the following concentrations by mass:

$0.2\% < P_2O_5 < 4\%$ $0 < F < 0.2\%$.

5. A method according to claim 2, wherein the preform is based on silica, and said doped peripheral outer zone is constituted by silica doped with at least the following dopants at the following concentrations by mass:

$0 < P_2O_5 < 2\%$ $0.1\% < Al_2O_3 < 2\%$ $0 < F < 1\%$.

* * * * *